US008066802B2

(12) United States Patent
Kristensson et al.

(10) Patent No.: US 8,066,802 B2
(45) Date of Patent: Nov. 29, 2011

(54) METHOD AND DEVICE FOR PROVIDING A ZONE OF CLEAN AIR AT AN OPERATION AREA AND USE OF SAID DEVICE

(75) Inventors: Dan Kristensson, Ängelholm (SE); Jan Kristensson, Ängelholm (SE); Pål Svensson, Halmstad (SE)

(73) Assignee: Airsonett AB, Angelholm (SE)

( * ) Notice: Subject to any disclaimer, the term of this patent is extended or adjusted under 35 U.S.C. 154(b) by 593 days.

(21) Appl. No.: 12/281,000

(22) PCT Filed: Feb. 26, 2007

(86) PCT No.: PCT/SE2007/000177
§ 371 (c)(1),
(2), (4) Date: Nov. 5, 2008

(87) PCT Pub. No.: WO2007/100286
PCT Pub. Date: Sep. 7, 2007

(65) Prior Publication Data
US 2009/0288555 A1 Nov. 26, 2009

(30) Foreign Application Priority Data
Feb. 28, 2006 (SE) ...................................... 0600459

(51) Int. Cl.
*B01D 46/00* (2006.01)

(52) U.S. Cl. ... 95/273; 55/385.1; 55/385.2; 55/DIG. 29; 362/96; 362/253

(58) Field of Classification Search ................. 55/385.1, 55/471, 486, 467, 320, 505, 510, 470, 472, 55/481, 493, DIG. 29; 362/96, 253; 454/66, 454/152, 158, 296, 297, 298; 95/273
See application file for complete search history.

(56) References Cited

U.S. PATENT DOCUMENTS 4,015,114 A * 3/1977 Paajanen et al. .............. 362/294
5,094,676 A * 3/1992 Karbacher ....................... 96/142
5,167,577 A * 12/1992 Kristensson .................. 454/298
(Continued)

FOREIGN PATENT DOCUMENTS

DE 23 37 454 A1 2/1975
(Continued)

*Primary Examiner* — Duane Smith
*Assistant Examiner* — Minh-Chau Pham
(74) *Attorney, Agent, or Firm* — Stites & Harbison PLLC; Marvin Petry

(57) ABSTRACT

The present invention relates to a method and a device for providing a zone (2) of clean air at an operation area (3) wherein an air treatment device (1) having a lighting device (25) is brought to a functional position such that the air treatment device (1) and the lighting device (25) are located above an operation area (3) and between the operation area (3) and a ceiling (32) in the operation premises (4). Air is taken into the air treatment device (1) from upper portions of the operation premises (4) and subsequently filtered in the air treatment device (1). The air is cooled in the air treatment device (1) to achieve a lower temperature than impure air (8) surrounding the zone (2) of clean air and subsequently discharged from the air treatment device (1) as a laminar air flow descending slowly downwards towards the operation area (3).

13 Claims, 5 Drawing Sheets

U.S. PATENT DOCUMENTS

| | | | | |
|---|---|---|---|---|
| 5,443,625 | A * | 8/1995 | Schaffhausen | 95/113 |
| 6,244,720 | B1 * | 6/2001 | Neff | 362/96 |
| 6,811,593 | B2 | 11/2004 | Hansson et al. | |
| 7,083,659 | B1 * | 8/2006 | Joyce et al. | 55/385.1 |
| 7,572,309 | B2 * | 8/2009 | Scagliarini | 55/385.4 |
| 7,850,753 | B2 * | 12/2010 | Scagliarini | 55/385.4 |
| 2002/0064038 | A1 | 5/2002 | Kummerfeld | |
| 2011/0011045 | A1 * | 1/2011 | Ton | 55/385.1 |

FOREIGN PATENT DOCUMENTS

| | | | |
|---|---|---|---|
| DE | 33 31 299 | A1 | 3/1985 |
| DE | 35 07 808 | A1 | 9/1986 |
| FR | 2 032 919 | A5 | 11/1970 |
| GB | 1 065 644 | A | 4/1967 |
| SE | 516 775 | C2 | 2/2002 |
| WO | WO 2005/017419 | A1 | 2/2005 |

* cited by examiner

METHOD AND DEVICE FOR PROVIDING A ZONE OF CLEAN AIR AT AN OPERATION AREA AND USE OF SAID DEVICE

BACKGROUND OF THE INVENTION

The present invention relates to a method and a device for providing a zone of clean air at an operation area by means of an air treatment device, wherein a lighting device is provided for illuminating the operation area. The invention also relates to use of said device.

The purpose of ventilating operation areas is to avoid as far as possible infections of patients being operated on. Infections are caused by bacteria-carrying airborne particles contaminating the operation area. Particularly the operation personnel generates airborne bacteria-carrying particles. It is the direct drop-off of these particles in the exposed operation area of the patient which is one of the main reasons for the spreading of infections in the operation premises.

At the present improved ventilating devices for operation premises, the operation lighting is most often located between a so called LAF (Laminar Air Flow)-ceiling, emitting a laminar, downwardly directed flow of air, and the operation area. The operation lighting disturbs the flows of air partly by its location and partly by the convection currents generated by the heating effect of the lighting. Both disturbances give rise to stagnation zones where bacteria-carrying airborne particles can be concentrated and is an important danger factor for bacterial propagation in the operation area.

Present ventilating ceilings, the so called LAF-ceilings, are mostly connected to an infrastructure/air treatment plant which is fixedly built into the hospital and which provide said LAF-ceilings with treated supply air. This infrastructure requires a great deal of engineering during installation and it is most often a building or heating, water and sanitation contractor carrying through the installation. The engineering and contractor's work is most often bought in by local heating, water and sanitation engineers and contractors who mostly know very little about medicine and transmissions of infections.

Present ventilating ceilings, the so called LAF-ceilings, also require very large air flows to compensate for the equipment located between the ceiling and the operation area. Furthermore, since the present ventilating devices are fixedly built into the ceiling of the operation premises, they must cover all types of surgery taking place in said operation premises. Thereby, the ventilating devices become large and require large volumes of filtered ventilating air, resulting in expensive, bulky installations and high operating costs.

The large ventilating ceilings must also through their size compensate for the convection currents of the operation personnel generated within the extension of the ceilings. A substantial part of the bacteria-carrying particles is generated in these convection currents.

Methods and devices for providing zones of clean air are previously known from e.g. U.S. Pat. No. 5,167,577 and WO 2005/017419, but these methods and devices are not specifically adapted to generate zones of clean air for operation areas. U.S. Pat. No. 6,811,593 relates to an air treatment device for, inter alia, operation areas, but this device is adapted to blow air in horizontal directions. The device neither considers the temperature of the supplied air relative to the temperature of the surrounding air in the premises nor the thermal zoning in the premises.

SUMMARY OF THE INVENTION

The object of the present invention is therefore to provide a method and a device particularly suited for use in connection with operation areas.

By combining the air treatment device and the lighting and locate them above the operation area or reversed locate the operation area such that it is found under the air treatment device and the lighting, and design said air treatment device to emit or discharge clean air to define a zone thereof in which the speed of the air flows is low and which has a limited extension at the operation area, minimal interference of surrounding impure air is achieved while at the same time optimal illumination of the operation area is obtained. Also, stagnation zones above the operation area are avoided and airborne bacteria-carrying particles from the operation personnel are prevented from reaching the operation area because particle generating operation personnel is found essentially outside the operation area. In other words, when the lighting for the operation area is optimized, the air supply relative to the lighting as well as the operation area is at the same time optimized. Irrespective of how the lighting is positioned, the ventilation is brought along therewith and otherwise usual stagnation zones are eliminated. Furthermore, the risk for infections is reduced, the dependency on nonprofessionals for installation is reduced, the possibility for medical documentation is increased, the energy costs and the costs for maintenance are reduced and the sound level is lower.

Other objects and advantages with the invention will be apparent for a skilled person studying the enclosed drawings and the following detailed description of preferred embodiments.

DETAILED DESCRIPTION OF PREFERRED EMBODIMENTS OF THE INVENTION

Figure 1:
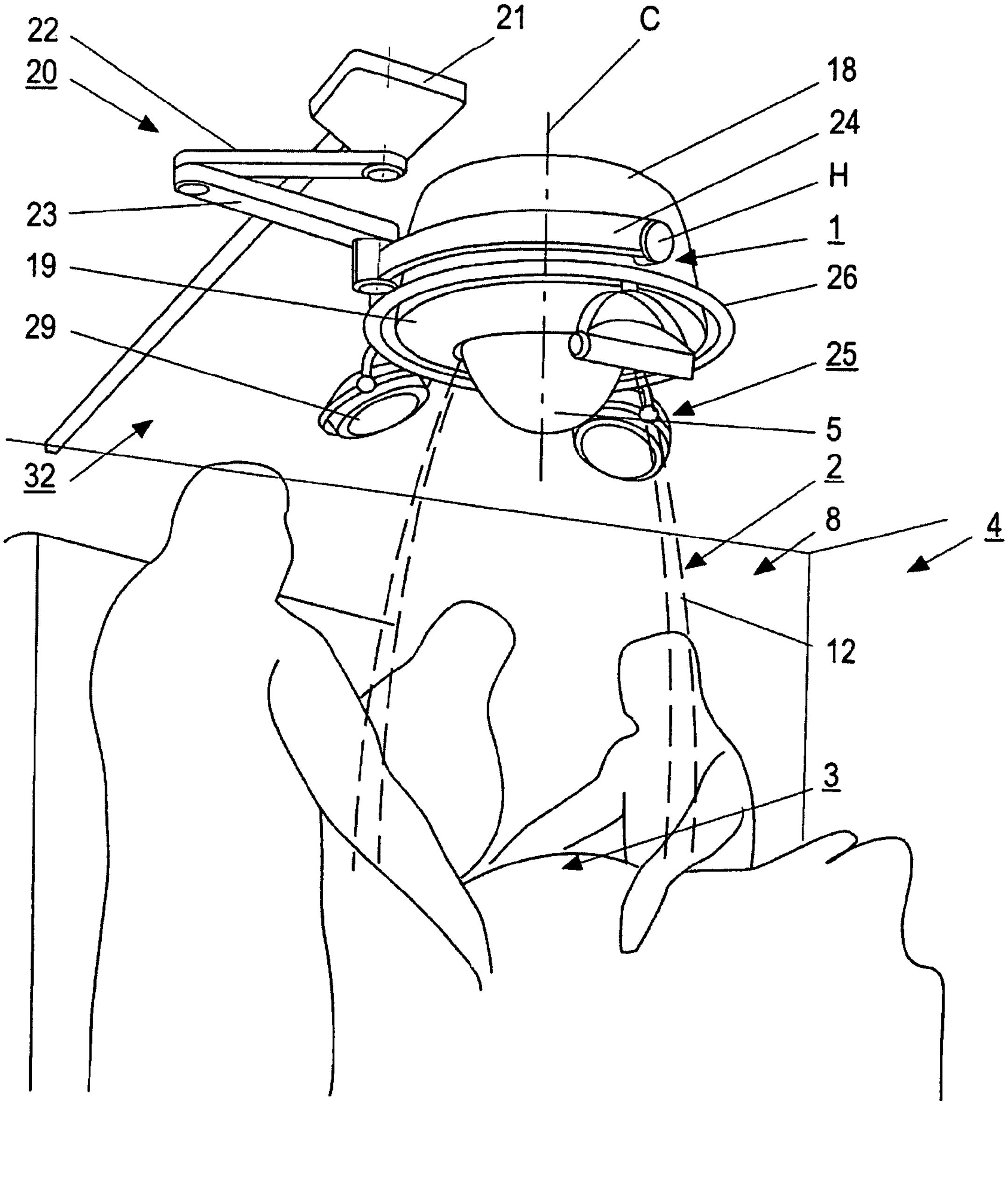
FIG. 1 is a perspective view of an operation area with an air treatment device according to the present invention.
Figure 2:
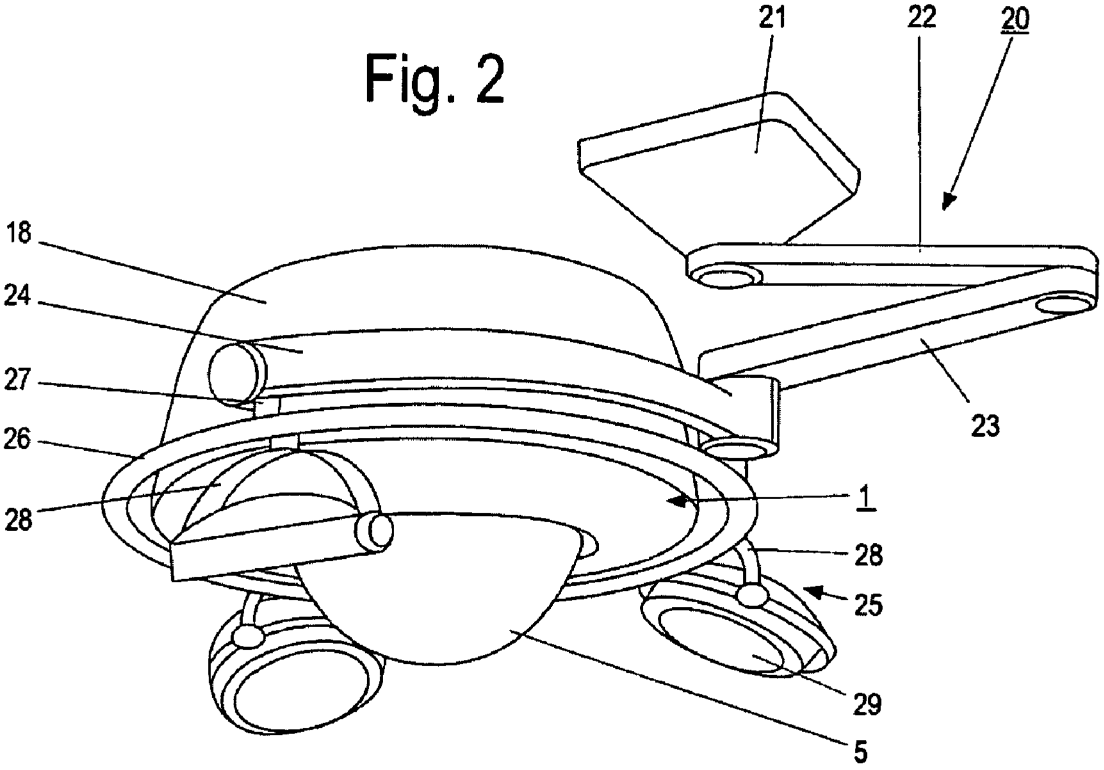
FIG. 2 is an enlarged perspective view of an air treatment device according to FIG. 1.
Figure 3:
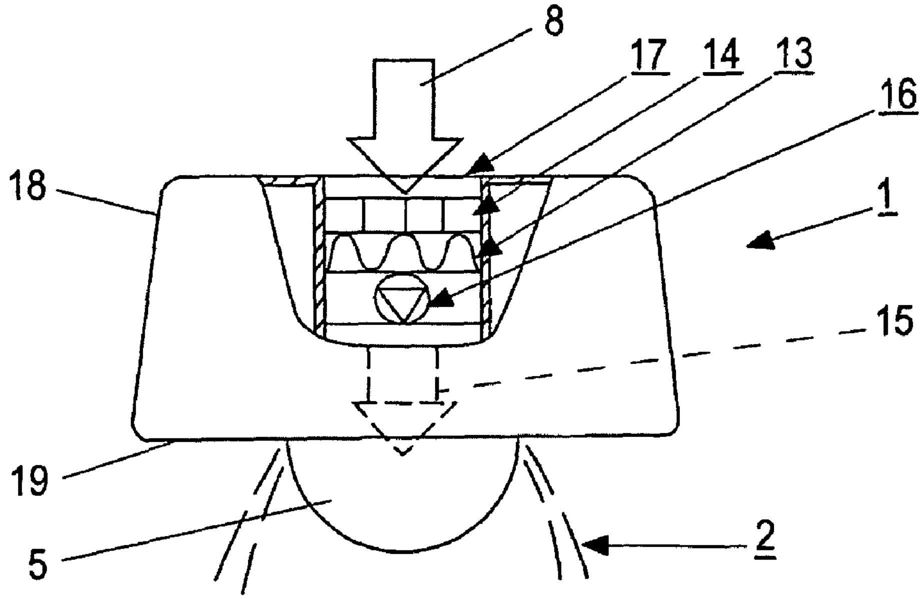
FIG. 3 is a schematic side view, partly in section, of an air treatment device according to FIG. 1.

The air treatment device 1 illustrated in the drawings is adapted to provide a zone 2 of clean air at an operation area 3 in medical care, wherein a lighting device 25 is provided for illuminating the operation area 3. The air treatment device 1 and the lighting device 25 are in the embodiment shown displaceable and located in functional positions above the operation area 3 and between said operation area and the ceiling 32 of the operation premises 4. Alternatively, if the air treatment device 1 and the lighting device 25 are fixed, the operation area 3, preferably formed or defined as an operation table, may be displaceable for location in a functional position such that the air treatment device 1 and the lighting device 25 are still found between the operation area 3 and the ceiling 32 of the operation premises 4 (see FIG. 7).

Figure 7:
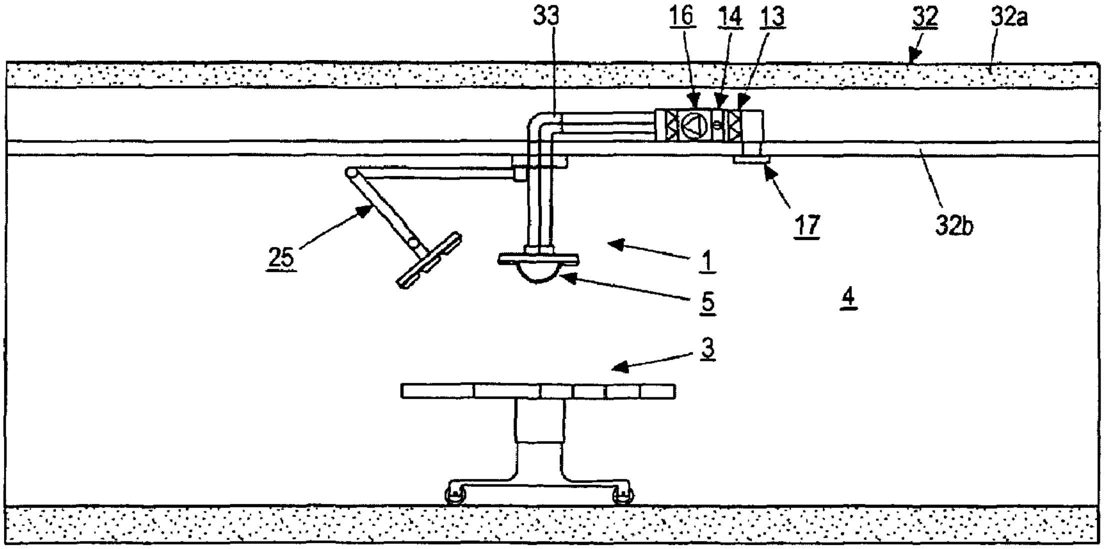
FIG. 7 finally, is a schematic side view of an alternative air treatment device and lighting device and an alternative operation area.

The ceiling 32 of the operation premises 4 in which the operation area 3 is found, comprises preferably a supporting framing member 32*a* as well as a ceiling member 32*b* beneath said supporting framing member (see FIG. 7). Thus, the air treatment device 1 and the lighting device 25 are at such an embodiment found between the ceiling member 32*b* and the operation area 3. Alternatively, as in FIG. 7, the air treatment device 1 may however be designed such that parts thereof are found between the supporting framing member 32*a* and the ceiling member 32*b*, while other parts of the air treatment device and the lighting device 25 are located between the ceiling member 32*b* and the operation area 3. The different parts of the air treatment device 1 are thereby interconnected through a rigid and/or flexible air channel 33.

A filter device 13 is provided to filter air for providing clean air which shall define the zone 2 of clean air. A device 14 for cooling air and/or taking in cool air is provided to allow clean air, which shall define the zone 2 of clean air, to have such lower temperature than impure air surrounding the zone 2 of clean air that said clean air descends slowly downwards towards the operation area 3. The air treatment device 1 may be connected to a cooling device 14 or to units with heat transfer liquid, cooling medium, cold drain water or similar. In embodiments where a cooling compressor or similar cooling machine is used, this may be mounted internally in the air treatment device 1 or externally thereof, connected through heat transfer or cooling medium conduits. It should be mentioned that most cooling devices generate waste heat in any form, but the present invention is not limited by or includes this waste heat. The air treatment device 1 may e.g. be connected to ordinary cold drain water. The air treatment device 1 may also be connected to an external heat transfer or cooling medium system with heat transfer or cooling medium produced in the hospital cooling plant, or finally, to an external cooling machine without thereby having to consider the waste heat.

Figure 4:
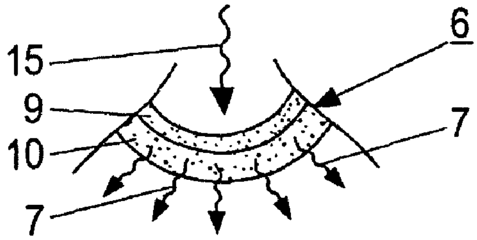
FIG. 4 is a section through parts of an air supply unit of the air treatment device according to FIG. 1.
Figure 5:
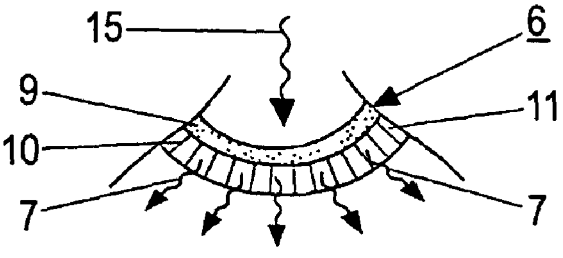
FIG. 5 is a section through parts of an alternative air supply unit of the air treatment device according to FIG. 1.

A device 5 is provided to emit or discharge laminar flows of clean air which shall define the zone 2 of clean air. The device 5 for emitting or discharging laminar flows of clean air includes preferably an air supply unit which at least partly may consist of a cell body 6 or similar which is provided to generate laminar partial flows 7 of clean air to minimize the risk of mixing impure air 8 from the surroundings into the zone 2 of clean air. The cell body 6 may consist of a material with open cells and/or a fabric. The cell body 6 may consist of an inner part 9 and an outer part 10 and the inner part may be provided such that it subjects through-flowing clean air to a larger pressure drop than the outer part 10. As is apparent from FIG. 4, the inner and outer parts 9, 10 of the cell body 6 may consist of cell body material. As is apparent from FIG. 5, the inner part 9 of the cell body 6 may consist of cell body material while the outer part 10 has tubular through-flow passages 11, the length of which is 4-10 times larger than the their width. Hereby, it is possible to achieve that an outer portion of the zone 2 of clean air has a minimum of turbulence.

In order to emit or discharge a distinct zone 2 of clean air with a distinct limited extension around the operation area 3, the air supply unit 5 preferably has at least partly semi-spherical, substantially semi-spherical or other shape. Hereby, and preferably along with the laminar flow of clean air in the zone 2 of clean air, it becomes possible to give the zone 2 of clean air an extension such that the operation personnel is found substantially outside said zone of clean air at the operation area 3.

The impure air 8 which is brought to flow towards the air supply unit 5, is brought to pass the filter device 13 such that the air becomes sufficiently clean to form the zone 2 of clean air at the operation area 3. This filter device 13 preferably has exchangeable filter elements of any suitable type.

The cooling device 14 may be provided to lower the temperature of air which shall define the zone 2 of clean air such that the air therein gets a lower temperature than the surrounding impure air 8. This is or may be contributing to that the air in the zone 2 of clean air can descend, thereby permitting a minimum of incorporation of impure air into said zone of clean air. The cooling device 14 is preferably controllable such that the temperature of passing clean air, and thereby the speed of the flow of air in the zone 2 of clean air, may be varied. The temperature in the zone 2 of clean air may e.g. be 0.5-5° C. lower than the surrounding impure air 8 and the flow of air in said zone of clean air may preferably be 100-1500 m3/h.

A flow 15 of clean air to the air supply unit 5 is preferably provided by means of a fan device 16. This fan device 16 may be controllable for controlling the speed of the flow 15 of clean air. The flow 15 of clean air generated by the fan device 16 is distributed essentially by the air supply unit 5 such that it can descend slowly downwards, primarily due to its lower temperature relative to the temperature in the surroundings.

The air treatment device 1 also includes at least one air inlet 17. The air inlet 17 may be provided for receiving or taking in air from upper parts of the operation premises 4.

The air treatment device 1 may include a container 18 on the lower side 19 of which the air supply unit 5 is provided directed downwards. The container 18 is through a suspension device 20 suspended from the ceiling 32 of the operation premises 4 or from a unit which is movable in the operation premises. The suspension device 20 permits setting of the container 18 in different positions relative to the operation area 3 and eventual movement thereof between different operation areas 3.

Said suspension device 20 may e.g. have a ceiling mount 21, a first horizontal arm 22 which is provided on said mount 21 such that it can pivot in relation thereto about a vertical axis, a second horizontal arm 23 which is provided on the first arm 22 such that it can pivot in relation thereto about a vertical axis, a semi-circular horizontal arm 24 which is located on the second arm 23 such that it is pivotable in relation thereto about a vertical axis. Two opposite side members of the container 18 are provided at the semi-circular arm 24 such that the container 18 can be pivoted relative to the arm 24 about a horizontal or substantially horizontal and diametrically relative to the container 18 directed axis H.

The container 18 may be cylindrical or substantially cylindrical and it may together with the air supply unit 5 be centered or substantially centered with a geometric and vertically or substantially vertically directed centre axis C. The container 18 may also be designed such that it is provided with the air inlet 17 and contains the filter device 13, cooling device 14 and fan device 16.

The lighting device 25 may be provided on and/or at the air treatment device 1 or on and/or at parts thereof. At the embodiment of FIG. 1, the lighting device 25 includes an annular bracket 26 which may be centered with the centre axis C. The lighting device 25 may, through brackets 27, be connected to the arm 24 or be connected to the container 18 and follow in such case the movements of the container if said container pivots relative to the arm 24. A plurality of, e.g. three, lamp holders 28 with lamps 29 may be provided on the annular bracket 26 and said lamps 29 can be directed such that they illuminate the operation area 3. The lamps 29 are preferably uniformly distributed about the centre axis C.

Figure 6:
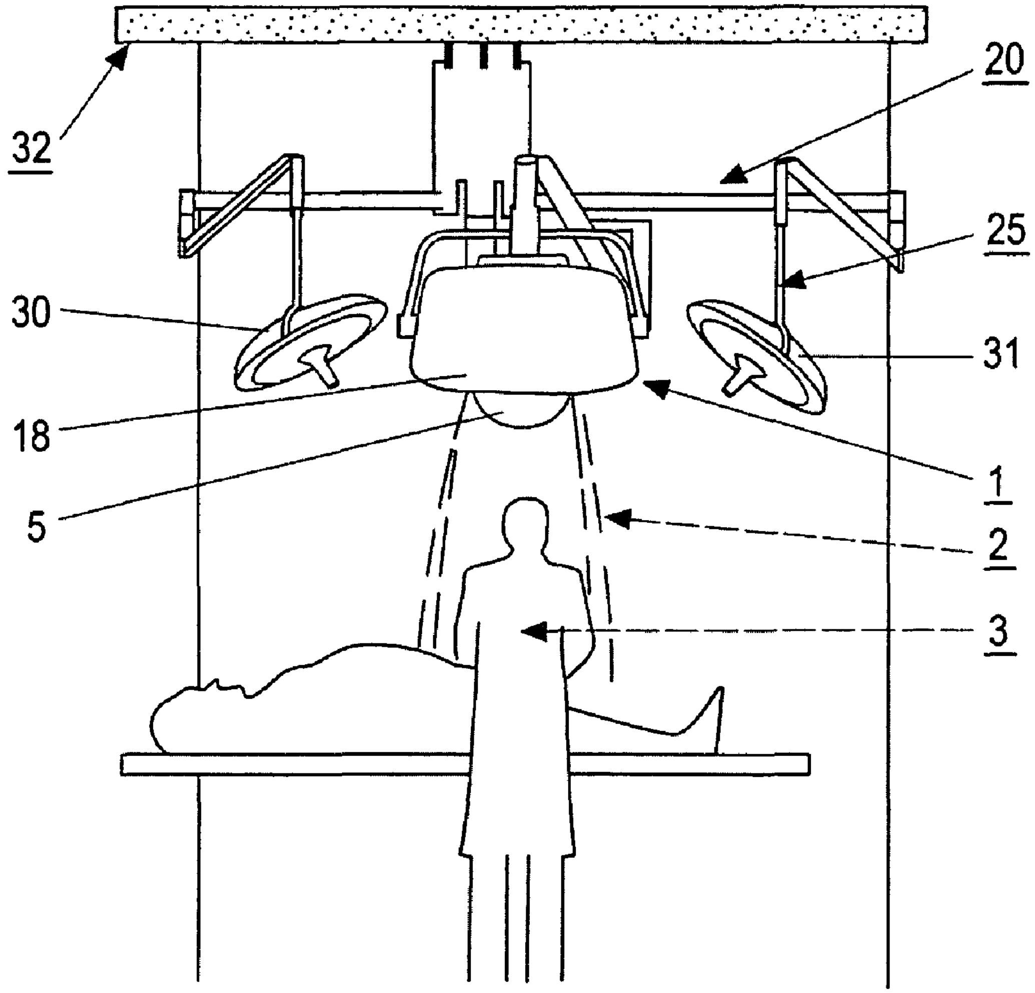
FIG. 6 is a perspective view of an air treatment device according to FIG. 1 having an alternative lighting device.

As is apparent from FIG. 6, the lighting device 25 may be provided and designed in another way. Thus, it may have one or more lighting units 30, 31 with one or more lamps 29 on each unit. The lighting units 30, 31 are preferably mounted on the same suspension device 20 as the air treatment device 1. The lighting device 25 may also be designed in other ways than described above and illustrated in the drawings.

With the exemplary device described above, the operator can optimize the illumination of the operation area and at the same time the air supply relative to the lighting as well as the operation area. Irrespective of how the operator locates the lighting, the ventilation is brought along therewith and vice versa.

The air treatment device 1 may be used at operation areas 3 in order to generate a zone 2 of clean air having a definite area of extension outside of which operation personnel and other things in the operation premises 4 are primarily found.

For visual marking of the extension and orientation of the zone 2 of clean air in and around the operation area 3, the air treatment device 1 may include a device, preferably a light device (not shown). This light device may be located around the device 5 for emitting or discharging laminar flows of clean air, preferably the air supply unit. In a preferred embodiment this light device may consist of a plurality of light emitting diodes which are located in a ring around said device or air supply unit 5. These light emitting diodes may emit coloured and/or white light.

It is obvious that if one wants to provide a zone 2 of clean air at or around other working areas than an operation area, with visual marking of the extension and orientation of said zone of clean air, the abovementioned device for said purpose may be used at these working areas too.

The air treatment device 1 may preferably also be used as infection-control ventilation and/or as ventilation for controlling the transmission of infections and/or as protective ventilation in the operation area 3 or for removing poisonous gases from the operation area.

The invention is not limited to what is described above and illustrated in the drawings, but may vary within the scope of the subsequent claims. Thus, the air supply unit 5 may be located in another way on a container 18 and if there is a container, said container may be designed in another way. The filter, cooling and fan devices 13, 14 and 16 may be provided in another way than in a container 18 and the suspension device 20 may be designed in another way than described above and illustrated in the drawings.

The air supply unit 5 may have another shape than at least semi-spherical or substantially semi-spherical shape or substantially semi-spherical cross section. An example of another shape is an elongated shape with semi-spherical cross section. Another example of such shape is if the lower parts of the air supply unit 5 are semi-spherical or substantially semi-spherical, while upper parts thereof have another shape. The cooling device 14 may be a thermoelectric device. The device 5 for emitting or discharging laminar flows of air in the zone 2 of clean air as well as generating a distinct zone 2 of clean air may be one and the same or different devices.

It should finally be mentioned that the combined air treatment and lighting device 1, may alternatively be displaceable relative to the operation area 3 by being suspended from a traverse, from a frame on wheels, hanging in a wire or similar, and the air treatment and lighting devices 1, 25 may be connected to each other in another way than described above.

The invention claimed is:

1. Method for providing a zone of clean air at an operation area by means of an air treatment device, wherein a lighting device is provided for illuminating the operation area wherein:

the air treatment device and the lighting device and/or the operation area are/is brought or have/has been brought to a functional position such that the air treatment device and the lighting device are located above the operation area and between said operation area and the ceiling in the operation premises in which the operation area is situated, air is received or taken in into the air treatment device from upper portions of the operation premises, air is filtered in the air treatment device for providing clean air which shall define the zone of clean air, air is cooled in the air treatment device to a temperature that is lower than the temperature of the air in the operation premises in order to allow clean air which shall define the zone of clean air to have such lower temperature than impure air surrounding the zone of clean air, that said clean air descends slowly downwards towards the operation area, and clean air which shall define the zone of clean air in and around the operation area is emitted or discharged from the air treatment device as laminar flows of clean air.

2. A device for providing a zone of clean air at an operation area by means of an air treatment device, wherein a lighting device is provided for illuminating the operation area, wherein:

the air treatment device and the lighting device and/or the operation area are/is in a functional position provided such that the air treatment device and the lighting device are located above the operation area and between said operation area and the ceiling in the operation premises in which the operation area is situated, the air treatment device has at least one air inlet which is provided for receiving or taking in air from upper parts of the operation premises, a filter device is provided in the air treatment device in order to filter air for providing clean air which shall define the zone of clean air, a device for cooling air to a lower temperature than the temperature of the air in the operation premises is provided in the air treatment device in order to allow clean air which shall define the zone of clean air to have such lower temperature than impure air surrounding the zone of clean air, that said clean air descends slowly downwards towards the operation area, and a device is provided in the air treatment device in order to emit or discharge laminar flows of clean air which shall define the zone of clean air in and around the operation area.

3. A device according to claim 2, wherein the ceiling in the operation premises in which the operation area is situated, comprises a supporting framing member as well as a ceiling member located beneath said supporting framing member, and that the air treatment device and the lighting device are located between the ceiling member and the operation area.

4. A device according to claim 3, wherein parts of the air treatment device are located between the supporting framing member and the ceiling member, while other parts of said air treatment member and the lighting device are located between said ceiling member and the operation area.

5. A device according to claim 4, wherein said parts of the air treatment device located between the supporting framing member and the ceiling member and said other parts of the air treatment device located between the ceiling member and the operation area are interconnected through a rigid and/or flexible air channel.

6. A device according to claim 2, wherein said device includes a control device for settling the temperature of the clean air in the zone of clean air and/or for controlling the speed of a fan device in order to control the speed of air in the zone of clean air.

7. A device according to claim 2, wherein:

the air treatment device includes a cylindrical or substantially cylindrical container which has a lower side on which the device for emitting or discharging laminar flows of clean air is provided directed downwards, the container and the device for emitting or discharging laminar flows of clean air are centered or substantially centered with a geometric and vertically directed centre axis, the container is provided on a suspension device, and the lighting device is provided on the suspension device and/or on the container.

8. A device according to claim 2, wherein a device is provided in the air treatment device for visual marking of the extension and orientation of the zone of clean air in and around the operation area.

9. A device according to claim 8, wherein said device for visual marking of the extension and orientation of the zone of clean air in and around the operation area includes a light device which is provided around the device for emitting or discharging laminar flows of clean air.

10. A device according to claim 9, wherein said light device consists of a plurality of light emitting diodes which are located in a ring around the device for emitting or discharging laminar flows of clean air and which emit colored and/or white light towards the operation area.

11. Use of the device according to claim 2, wherein said device is used to provide a zone of clean air having such limited extension around the operation area that the operation personnel is found essentially outside said zone of clean air.

12. Use of the device according to claim 2, wherein said device is used to provide a zone of clean air in and around the operation area in order to lower the risk that a patient is infected because of the operation and/or for removing poisonous gases from the operation area.

13. Use of the device according to claim 8, wherein said device is used to provide a zone of clean air at or around another working area than an operation area, with visual marking of the extension and orientation of said zone of clean air.

* * * * *